(12) United States Patent
Ho et al.

(10) Patent No.: US 9,432,122 B2
(45) Date of Patent: Aug. 30, 2016

(54) OPTICAL NETWORKING UNIT (ONU) PACKAGING

(71) Applicant: Applied Optoelectronics, Inc., Sugar Land, TX (US)

(72) Inventors: I-Lung Ho, Sugar Land, TX (US); Jun Zheng, Missouri City, TX (US); Hung-Lun Chang, Sugar Land, TX (US)

(73) Assignee: Applied Optoelectronics, Inc., Sugar Land, TX (US)

( * ) Notice: Subject to any disclaimer, the term of this patent is extended or adjusted under 35 U.S.C. 154(b) by 96 days.

(21) Appl. No.: 14/188,768

(22) Filed: Feb. 25, 2014

(65) Prior Publication Data

US 2015/0245114 A1 Aug. 27, 2015

(51) Int. Cl.
*H04B 10/08* (2006.01)
*H04B 10/50* (2013.01)
*H04B 10/079* (2013.01)
*H04J 14/02* (2006.01)

(52) U.S. Cl.
CPC .......... *H04B 10/503* (2013.01); *H04B 10/079* (2013.01); *H04J 14/0256* (2013.01); *H04J 14/0282* (2013.01); *Y10T 29/49002* (2015.01)

(58) Field of Classification Search
CPC H04B 10/2503; H04B 10/40; H04B 10/503; H04B 10/079
See application file for complete search history.

(56) References Cited

U.S. PATENT DOCUMENTS

| | | |
|---|---|---|
| 2004/0151505 A1* | 8/2004 | Aronson et al. ............... 398/138 |
| 2011/0052125 A1* | 3/2011 | Lee ....................... G02B 6/4246 385/88 |
| 2012/0301152 A1* | 11/2012 | Edwards et al. ............... 398/135 |
| 2012/0301156 A1* | 11/2012 | Thompson et al. ........... 398/188 |
| 2013/0148977 A1* | 6/2013 | Shah et al. ..................... 398/135 |
| 2015/0055960 A1* | 2/2015 | Zheng et al. .................. 398/135 |

* cited by examiner

*Primary Examiner* — Dzung Tran
(74) *Attorney, Agent, or Firm* — Grossman Tucker Perreault & Pfleger, PLLC; Norman S. Kinsella

(57) ABSTRACT

A bidirectional optical subassembly (BOSA) optical networking unit (ONU) generally includes a BOSA housing. A tunable laser is located in the BOSA housing and is configured to generate a first optical signal for transmission at a first selected wavelength based on temperature control. The tunable laser is a distributed feedback (DFB) laser diode. A thermal management device is also located in the BOSA housing and is configured to provide the temperature control. A photo diode is further located in the BOSA housing and is configured to receive a second optical signal at a second selected wavelength. The BOSA housing comprises an alloy of stainless steel or an alloy of Kovar.

17 Claims, 5 Drawing Sheets

OPTICAL NETWORKING UNIT (ONU) PACKAGING

TECHNICAL FIELD

The present disclosure relates to optical network units and more particularly, to improved packaging for ONUs with reduced cost and increased thermal conduction efficiency for use on a multi-channel bi-directional optical subassembly (BOSA).

BACKGROUND INFORMATION

Optical communications networks, at one time, were generally "point to point" type networks including a transmitter and a receiver connected by an optical fiber. Such networks are relatively easy to construct but deploy many fibers to connect multiple users. As the number of subscribers connected to the network increases and the fiber count increases rapidly, deploying and managing many fibers becomes complex and expensive.

A passive optical network (PON) addresses this problem by using a single "trunk" fiber from a transmitting end of the network, such as an optical line terminal (OLT), to a remote branching point, which may be up to 20 km or more. The remote branching point may in turn be optically coupled to destination subscriber units or optical networking units (ONUs). One challenge in developing such a PON is utilizing the capacity in the trunk fiber efficiently in order to transmit the maximum possible amount of information on the trunk fiber. Fiber optic communications networks may increase the amount of information carried on a single optical fiber by multiplexing different optical signals on different wavelengths using wavelength division multiplexing (WDM). In a WDM-PON, for example, the single trunk fiber carries optical signals at multiple channel wavelengths to and from the optical branching point and the branching point provides a simple routing function by directing signals of different wavelengths to and from individual subscribers (ONUs). In this case, each subscriber may be assigned one or more of the channel wavelengths on which to send and/or receive data.

To transmit and receive optical signals over multiple channel wavelengths, the OLT in a WDM-PON may include a multi-channel transmitter optical subassembly (TOSA) and a multi-channel receiver optical subassembly (ROSA). One example of a TOSA includes an array of lasers optically coupled to an arrayed waveguide grating (AWG) to combine multiple optical signals at multiple channel wavelengths. To provide the different channel wavelengths, tunable lasers may be used in the multi-channel TOSA and the wavelengths emitted by the tunable lasers change with changes in temperature. The ONUs in a WDM-PON may include a bi-directional optical subassembly (BOSA) comprising both a TOSA (e.g., a laser diode) for transmission and ROSA (e.g., a photo diode) for reception of these optical signals.

As optical networks increase in coverage and greater numbers of ONUs are deployed in subscriber's homes, e.g., fiber-to-the-home (FTTH), it becomes increasingly important to reduce the cost of the ONU. One challenge to ONU cost reduction is that a separate housing is generally employed for the TOSA (sometimes referred to as a boxed TOSA) in addition to the housing provided for the ONU. This additional housing is typically a hermetically sealed housing (e.g., under a vacuum) which may be one of the more expensive components of the system.

Another challenge is to provide efficient thermal management for the ONUs, and for the laser in particular, since unwanted temperature variations may affect laser tuning and the resulting wavelength of the generated optical signal. Providing adequate temperature control of the laser in a relatively small space and with relatively low power consumption may be difficult. The traditional boxed TOSA design may decrease the thermal management effectiveness of the ONU system by interposing an additional insulating layer between the laser and the thermal management system.

BRIEF DESCRIPTION OF THE DRAWINGS

These and other features and advantages will be better understood by reading the following detailed description, taken together with the drawings wherein.

DETAILED DESCRIPTION

Figure 1:
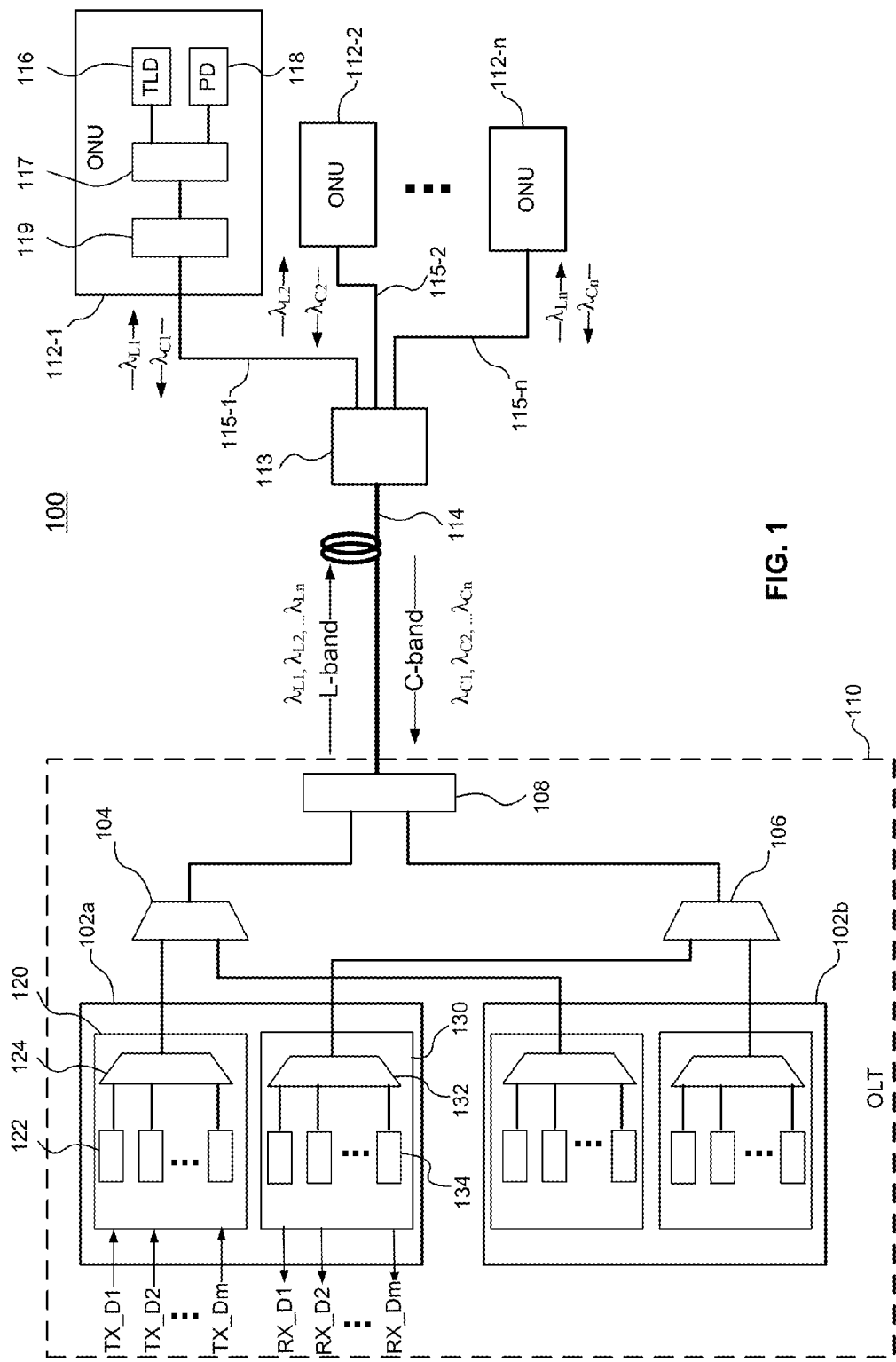
FIG. 1 is a functional block diagram of a wavelength division multiplexed (WDM) passive optical network (PON) including at least one optical networking unit (ONU), consistent with embodiments of the present disclosure.

A bi-directional optical subassembly (BOSA) of an optical networking unit (ONU), consistent with embodiments described herein, generally includes a transmit optical subassembly (TOSA), a receive optical subassembly (ROSA) and a thermal management system, in a single housing or package (BOSA housing). The BOSA housing may partially or completely encompass the TOSA and ROSA such that the required level of protection from external elements is provided, thus eliminating the need for an additional independent housing for the TOSA. In some embodiments, the BOSA housing may be fabricated from stainless steel for improved heat distribution. The thermal management system may include a thermistor to monitor temperature and a thermoelectric cooler (TEC) device to control temperature based, for example, on feedback from the thermistor. The TOSA may include a distributed feedback (DFB) laser diode configured to adjust or thermally tune the wavelength of the generated optical signal based on temperature. The BOSA ONU may be used in a wavelength division multiplexed (WDM) or dense wavelength division multiplexed (DWDM) optical system, for example, in a WDM or DWDM passive optical network (PON).

As used herein, a "laser package" refers to a laser diode packaged with other components such as a submount, a monitor photodiode, a thermal shield, and/or optics. As used herein, "channel wavelengths" refer to the wavelengths associated with optical channels and may include a specified wavelength band around a center wavelength. In one example, the channel wavelengths may be defined by an International Telecommunication (ITU) standard such as the ITU-T dense wavelength division multiplexing (DWDM) grid. As used herein, "tuning to a channel wavelength" refers to adjusting a laser output such that the emitted laser light includes the channel wavelength. The term "coupled" as used herein refers to any connection, coupling, link or the like and "optically coupled" refers to coupling such that light from one element is imparted to another element. Such "coupled" devices are not necessarily directly connected to one another and may be separated by intermediate components or devices that may manipulate or modify such signals. As used herein, "thermally coupled" refers to a direct or indirect connection or contact between two components resulting in heat being conducted from one component to the other component. As used herein, "thermally isolated" refers to an arrangement where heat is prevented from being conducted to the isolated component from an external environment. In a thermally isolated multi-channel TOSA, for example, heat external to the TOSA is prevented from being conducted to one or more components in the TOSA. As used herein, "thermally shielded" refers to an arrangement that prevents heat from being transferred by convection or radiation to the shielded component. Thermally isolated and thermally shielded do not necessarily require an arrangement to prevent all heat from being conducted or transferred.

Referring to FIG. 1, a WDM-PON 100 including one or more multi-channel optical transceivers 102a, 102b, consistent with embodiments of the present disclosure, is shown and described. The WDM-PON 100 provides a point-to-multipoint optical network architecture using a WDM (or DWDM) system. According to one embodiment of the WDM-PON 100, at least one optical line terminal (OLT) 110 may be coupled to a plurality of optical networking terminals (ONTs) or optical networking units (ONUs) 112-1 to 112-n via optical fibers, waveguides, and/or paths 114, 115-1 to 115-n. Although the OLT 110 includes two multi-channel optical transceivers 102a, 102b in the illustrated embodiment, the OLT 110 may include one or more multi-channel optical transceivers.

The OLT 110 may be located at a central office of the WDM-PON 100, and the ONUs 112-1 to 112-n may be located in homes, businesses or other types of subscriber location or premises. A branching point 113 (e.g., a remote node) couples a trunk optical path 114 to the separate optical paths 115-1 to 115-n to the ONUs 112-1 to 112-n at the respective subscriber locations. The branching point 113 may include one or more passive coupling devices such as a splitter or optical multiplexer/demultiplexer. In one example, the ONUs 112-1 to 112-n may be located about 20 km or less from the OLT 110.

The WDM-PON 100 may also include additional nodes or network devices, such as Ethernet PON (EPON) or Gigabit PON (GPON) nodes or devices, coupled between the branching point 113 and ONUs 112-1 to 112-n at different locations or premises. One application of the WDM-PON 100 is to provide fiber-to-the-home (FTTH) or fiber-to-the-premises (FTTP) capable of delivering voice, data, and/or video services across a common platform. In this application, the central office may be coupled to one or more sources or networks providing the voice, data and/or video.

In the WDM-PON 100, different ONUs 112-1 to 112-n may be assigned different channel wavelengths for transmitting and receiving optical signals. In one embodiment, the WDM-PON 100 may use different wavelength bands for transmission of downstream and upstream optical signals relative to the OLT 110 to avoid interference between the received signal and back reflected transmission signal on the same fiber. For example, the L-band (e.g., about 1565 to 1625 nm) may be used for downstream transmissions from the OLT 110 and the C-band (e.g., about 1530 to 1565 nm) may be used for upstream transmissions to the OLT 110. The upstream and/or downstream channel wavelengths may generally correspond to the ITU grid. In one example, the upstream wavelengths may be aligned with the 100 GHz ITU grid and the downstream wavelengths may be slightly offset from the 100 GHz ITU grid. Other wavelengths and wavelength bands are also within the scope of the system and method described herein.

The branching point 113 may demultiplex a downstream WDM optical signal (e.g., $\lambda_{L1}$, $\lambda_{L2}$, $\lambda Ln$) from the OLT 110 for transmission of the separate channel wavelengths to the respective ONUs 112-1 to 112-n. Alternatively, the branching point 113 may provide the downstream WDM optical signal to each of the ONUs 112-1 to 112-n and each of the ONUs 112-1 to 112-n separates and processes the assigned optical channel wavelength. The individual optical signals may be encrypted to prevent eavesdropping on optical channels not assigned to a particular ONU. The branching point 113 also combines or multiplexes the upstream optical signals from the respective ONUs 112-1 to 112-n for transmission as an upstream WDM optical signal (e.g., $\lambda_{C1}$, $\lambda_{C2}$, ... $\lambda_{Cn}$) over the trunk optical path 114 to the OLT 110.

One embodiment of the ONU 112-1 includes a laser 116, such as a laser diode or DFB laser diode, for transmitting an optical signal at the assigned upstream channel wavelength and a photodetector 118, such as a photodiode, for receiving an optical signal at the assigned downstream channel wavelength. The laser 116 may include a tunable laser configured to be tuned to the assigned channel wavelength, for example based on temperature. This embodiment of the ONU 112-1 may also include a diplexer 117 coupled to the laser 116 and the photodetector 118 and a band filter 119 coupled to the diplexer 117, configured to allow the assigned channel wavelengths to be received and transmitted by the ONU 112-1.

The OLT 110 may be configured to generate multiple optical signals at different channel wavelengths and to combine the optical signals into the downstream WDM optical signal carried on the trunk optical fiber or path 114. Each of the OLT multi-channel optical transceivers 102a, 102b may include a multi-channel transmitter optical subassembly (TOSA) 120 for generating and combining the optical signals at the multiple channel wavelengths. The OLT 110 may also be configured to separate optical signals at different channel wavelengths from an upstream WDM optical signal carried on the trunk path 114 and to receive the separated optical signals. Each of the OLT multi-channel optical transceivers 102a, 102b may thus include a multi-channel receiver optical subassembly (ROSA) 130 for separating and receiving the optical signals at multiple channel wavelengths.

One embodiment of the multi-channel TOSA 120 includes an array of lasers 122, such as laser diodes, which may be modulated by respective RF data signals (TX_D1 to TX_Dm) to generate the respective optical signals. The lasers 122 may be modulated using various modulation techniques including external modulation and direct modulation. An optical multiplexer 124, such as an arrayed waveguide grating (AWG), combines the optical signals at the different respective downstream channel wavelengths. The TOSA 120 may also include a temperature control system for controlling temperature of the lasers 122 and the multiplexer 124 to maintain a desired wavelength precision or accuracy.

In some embodiments, the lasers 122 may be tunable lasers configured to generate the optical signals at the respective channel wavelengths. In other embodiments, the lasers 122 may be configured to generate optical signals over a band of channel wavelengths and filtering and/or multiplexing techniques may be used to produce the assigned channel wavelengths. In the illustrated embodiment, the OLT 110 further includes a multiplexer 104 for multiplexing the multiplexed optical signal from the multi-channel TOSA 120 in the multi-channel transceiver 102*a* with a multiplexed optical signal from a multi-channel TOSA in the other multi-channel transceiver 102*b* to produce the downstream aggregate WDM optical signal.

One embodiment of the multi-channel ROSA 130 includes a demultiplexer 132 for separating the respective upstream channel wavelengths. An array of photodetectors 134, such as photodiodes, detects the optical signals at the respective separated upstream channel wavelengths and provides the received data signals (RX_D1 to RX_Dm). In the illustrated embodiment, the OLT 110 further includes a demultiplexer 106 for demultiplexing the upstream WDM optical signal into first and second WDM optical signals provided to the respective multi-channel ROSA in each of the transceivers 102*a*, 102*b*. The OLT 110 also includes a diplexer 108 between the trunk path 114 and the multiplexer 104 and the demultiplexer 106 such that the trunk path 114 carries both the upstream and the downstream channel wavelengths. The transceivers 102*a*, 102*b* may also include other components, such as laser drivers, transimpedance amplifiers (TIAs), and control interfaces, used for transmitting and receiving optical signals.

Figure 2:
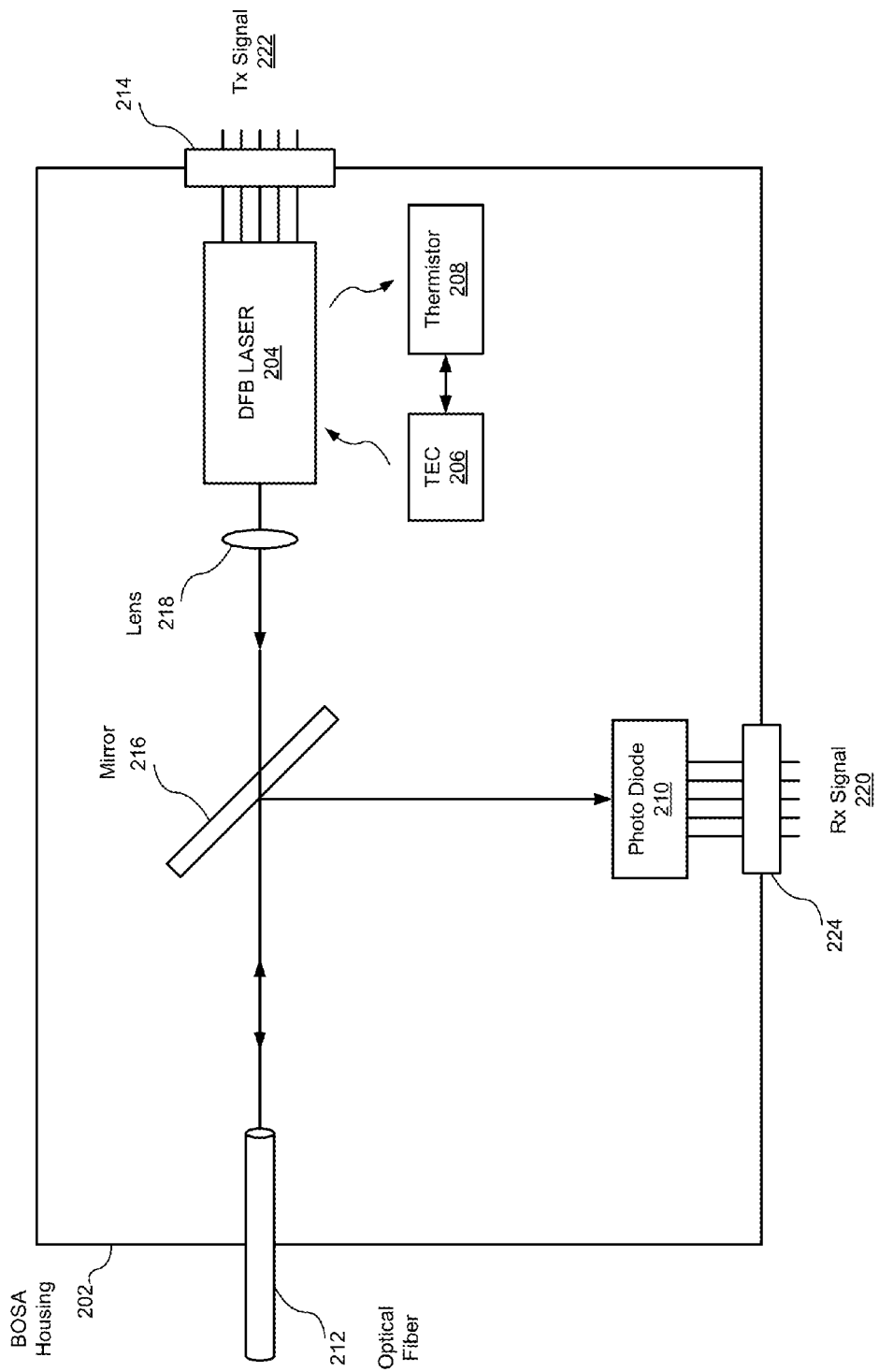
FIG. 2 is a block diagram of an ONU bi-directional optical subassembly (BOSA) consistent with an embodiment of the present disclosure.

FIG. 2 illustrates a block diagram of an ONU BOSA consistent with an embodiment of the present disclosure. The ONU BOSA, which may, for example, be an ONU 112 as in FIG. 1, is shown to include a DFB laser 204, a TEC 206, a thermistor 208, a photo diode 210, a mirror 216 and a lens 218 enclosed within a housing 202. DFB laser 204 may be configured to generate an optical signal (e.g., laser light) for transmission over optical fiber 212 based on transmission signals 222 that are provided to the ONU. The transmission signals 222 may be provided through a connector 214, for example a pin connector, integrated with the BOSA housing 202. The connector 214 may be configured to couple the ONU to external systems or circuits that generate the transmission signals 222. Lens 218 may be configured to optically couple the generated laser light onto the optical fiber 212. The laser light may pass through mirror 216 and optional filters (not shown) configured to filter the light to a desired wavelength band, for example the C-band. DFB laser 204 may be a temperature controlled tunable laser. TEC 206 may be configured to adjust or maintain the temperature of DFB laser 204 within a desired range. For example, in some embodiments, the laser may be tuned to any of 16 different wavelengths. Thermistor 208 may be configured to perform temperature measurements of the laser and/or the surrounding environment and provide these measurements to the TEC 206, for example as a feedback signal to assist with thermal regulation.

Mirror 216 may be configured to reflect optical signals received by the ONU, over optical fiber 212, to photo diode 210. Mirror 216 may thus serve the purpose of diplexer 117. The received optical signal may also pass through optional filters (not shown) configured to filter the light to a desired wavelength band, for example the L-band. Photo diode 210 may be configured to detect the optical signal and provide the received data signals 220. In some embodiments, photo diode 210 may be an avalanche photo diode and may be coupled to a transimpedance amplifier to improve signal to noise ratio of the received signals. The received data signals 220 may be provided through a connector 224, for example a pin connector, integrated with the BOSA housing 202. The connector 224 may be configured to couple the ONU to external systems or circuits that process the received signals 220.

BOSA housing 202 may be fabricated as a single metal housing, for example from an alloy of stainless steel or Kovar, to protect the internal components of the ONU from external elements and environmental conditions. The degree of protection provided by the housing 202 may be sufficient to eliminate the need for a separate, additional housing dedicated to the TOSA, for example a hermetically sealed housing as would typically be used. In some embodiments, the housing material may be amenable to welding and/or the housing 202 may be formed through a welding process.

The elimination of a TOSA housing and associated vacuum may reduce the complexity of the manufacturing process for the ONU, which in turn may decrease the cost and increase the reliability of the ONU. Additionally, the use of a single material composition may improve heat distribution through the ONU and improve efficiency of thermal management of the laser.

Figure 3:
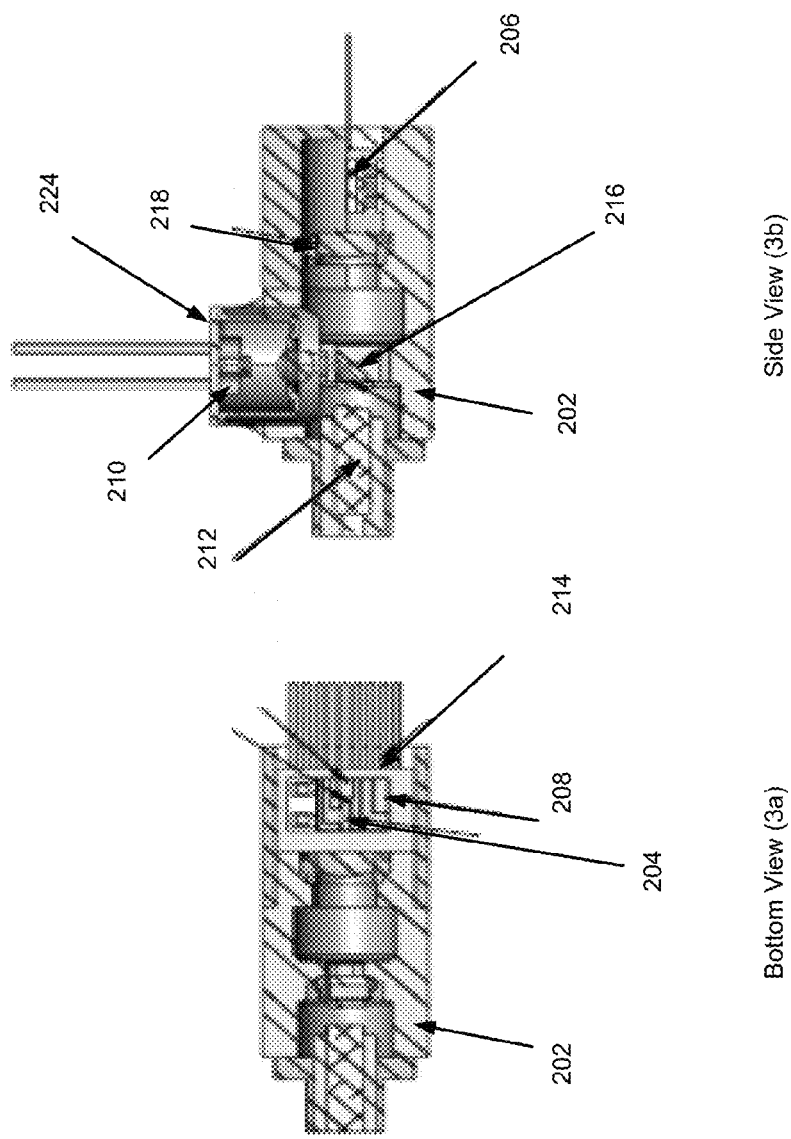
FIG. 3 presents bottom and side cross sectional views of an ONU BOSA consistent with an embodiment of the present disclosure.

Referring to FIG. 3, a bottom cross sectional view (3*a*) and side cross sectional view (3*b*) of an ONU BOSA, consistent with an embodiment of the present disclosure, is illustrated. The bottom cross sectional view 3(*a*) shows an example of relative placement of components including housing 202, DFB laser 204, thermistor 208 and transmit signal pin connector 214, the operations of which are described above. The top cross sectional view 3(*b*) shows an example of relative placement of components including housing 202, optical fiber 212, photo diode 210, receive signal pin connector 224, lens 218 (which may be an aspherical lens), mirror 216, and TEC 206, the operations of which are described above. The BOSA housing 202 eliminates the need for a separate, and possibly hermetically sealed, housing for the TOSA (e.g., DFB laser and thermal management system). The BOSA housing may be fabricated from an alloy of stainless steel, Kovar or any other suitable material that provides sufficient protection and thermal conductivity for the ONU components.

Figure 4:
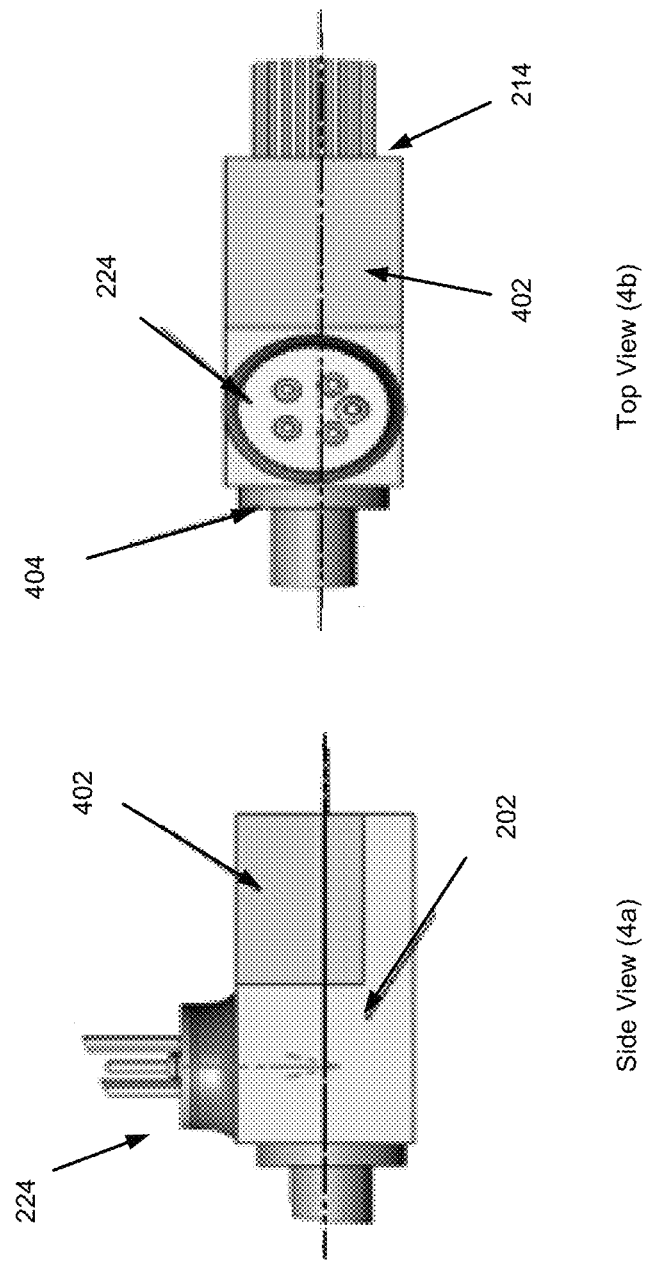
FIG. 4 presents side and top views of an ONU BOSA housing consistent with an embodiment of the present disclosure.

Referring to FIG. 4, a side view (4*a*) and a top view (4*b*) of an ONU BOSA, consistent with an embodiment of the present disclosure is illustrated. The side view (4*a*) shows the housing 202 and receive signal pin connector 224 from an external vantage point. In some embodiments, a cover 402 may also be deployed to provide access to internal components of the ONU, for example to facilitate assembly or for maintenance purposes. The top view (4*b*) shows receive signal pin connector 224, transmit signal pin connector 214, cover 402 and the optical fiber housing 404 from an external vantage point.

Figure 5:
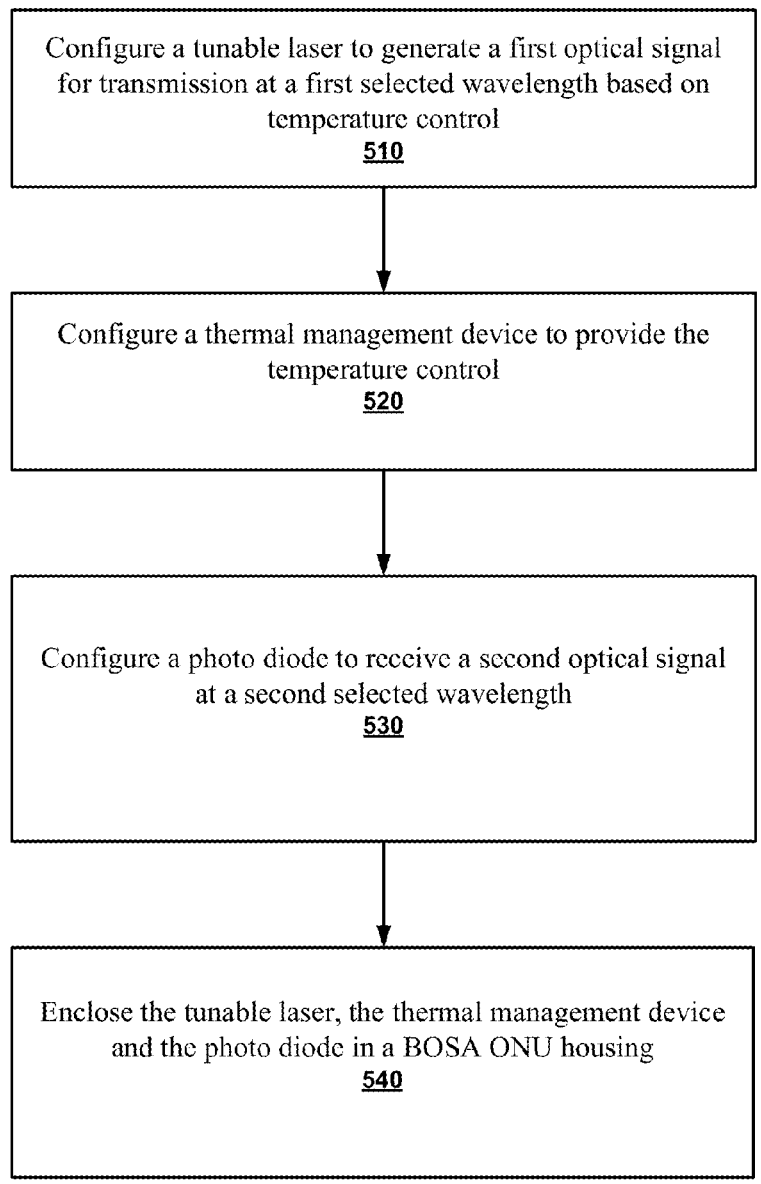
FIG. 5 illustrates a flowchart of operations of another example embodiment consistent with the present disclosure.

Referring to FIG. 5, a flowchart of operations 500 illustrates a method for fabricating a BOSA ONU consistent with another embodiment of the present disclosure. At operation 510, a tunable laser is configured to generate a first optical signal for transmission at a first selected wavelength based on temperature control. At operation 520, a thermal management device is configured to provide the temperature control. At operation 530, a photo diode is configured to receive a second optical signal at a second selected wavelength. At operation 540, the tunable laser, the thermal management device and the photo diode are enclosed in a BOSA ONU housing. The housing may be fabricated from an alloy of stainless steel or an alloy of Kovar. The housing may further comprise a removable cover, one or more signal pin connectors and an optical fiber coupler/housing.

Consistent with an embodiment, a bidirectional optical subassembly (BOSA) optical networking unit (ONU)

includes a BOSA housing configured to enclose the BOSA. A tunable laser is located in the BOSA housing and is configured to generate an optical signal for transmission at a selected transmission wavelength. The transmission wavelength is based on temperature control. The tunable laser is a distributed feedback (DFB) laser diode. A thermal management device is also located in the BOSA housing and is configured to provide the temperature control. A photo diode is further located in the BOSA housing and is configured to receive a second optical signal at a second selected wavelength. The BOSA housing comprises an alloy of stainless steel or an alloy of Kovar.

Consistent with another embodiment, a method for fabricating a bidirectional optical subassembly (BOSA) optical networking unit (ONU) includes configuring a tunable laser to generate an optical signal for transmission at a selected wavelength based on temperature control. The method also includes configuring a thermal management device to provide the temperature control. The method of this example further includes configuring a photo diode to receive a second optical signal at a second selected wavelength. The method of this example still further includes enclosing the tunable laser, the thermal management device and the photo diode in a BOSA ONU housing. The BOSA housing comprises an alloy of stainless steel or an alloy of Kovar.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A bidirectional optical subassembly (BOSA) optical networking unit (ONU) comprising:
   a BOSA housing configured to be coupled to a single optical fiber for transmitting and receiving optical signals, said BOSA housing comprising a single metal housing and a removable cover over a portion of said single metal housing to provide access to an interior of the BOSA ONU, wherein said BOSA housing comprises an alloy of stainless steel or an alloy of Kovar to provide thermal conductivity for components in said ONU;
   a tunable laser located in said BOSA housing without a separate TOSA housing, said tunable laser configured to generate a first optical signal for transmission at a first selected wavelength based on temperature control;
   a thermal management device located in said BOSA housing, said thermal management device configured to provide said temperature control;
   a photo diode located in said BOSA housing, said photo diode configured to receive a second optical signal at a second selected wavelength; and
   a diplexer optically coupled to said tunable laser and to said photo diode, said diplexer being configured to optically couple said first optical signal from said tunable laser to said single optical fiber and to optically couple said second optical signal from said single optical fiber to said photo diode.

2. The BOSA ONU of claim 1, wherein said tunable laser comprises a laser diode.

3. The BOSA ONU of claim 2, wherein said laser diode is a distributed feedback (DFB) laser.

4. The BOSA ONU of claim 1, wherein said thermal management device comprises a thermoelectric cooler configured to adjust temperature within said BOSA housing and a thermistor configured to measure temperature within said BOSA housing.

5. The BOSA ONU of claim 1, wherein said first and second selected wavelengths includes International Telecommunication (ITU) dense wavelength division multiplexing (DWDM) channels wavelengths.

6. The BOSA ONU of claim 1, wherein said photo diode is an avalanche photo diode coupled to a transimpedance amplifier.

7. The BOSA ONU of claim 1, wherein said BOSA housing comprises one or more signal pin connectors configured to couple said ONU to external systems.

8. The BOSA ONU of claim 1, wherein said BOSA housing comprises an optical fiber housing configured to couple said single optical fiber for transmission of said first optical signal and reception of said second optical signal.

9. The BOSA ONU of claim 1, wherein said BOSA ONU is one of a plurality of BOSA ONUs coupled to a DWDM passive optical network (PON).

10. A method for fabricating a bidirectional optical subassembly (BOSA) optical networking unit (ONU), said method comprising:
    configuring a tunable laser to generate a first optical signal for transmission at a first selected wavelength based on temperature control;
    configuring a thermal management device to provide said temperature control;
    configuring a photo diode to receive a second optical signal at a second selected wavelength;
    enclosing said tunable laser, said thermal management device and said photo diode in a BOSA ONU housing without separately enclosing said tunable laser in a TOSA housing, said BOSA housing comprising a single metal housing and a removable cover over a portion of said single metal housing to provide access to an interior of the BOSA ONU, wherein said BOSA housing comprises an alloy of stainless steel or an alloy of Kovar to provide thermal conductivity for components in said ONU; and
    optically coupling a diplexer between both said tunable laser and said photo diode and a single optical fiber such that said diplexer is configured to optically couple said first optical signal from said tunable laser to said single optical fiber and to optically couple said second optical signal from said the single optical fiber to said photo diode.

11. The method of claim 10, wherein said tunable laser comprises a laser diode.

12. The method of claim 11, wherein said laser diode is a distributed feedback (DFB) laser.

13. The method of claim 10, wherein said thermal management device comprises a thermoelectric cooler configured to adjust temperature within said BOSA ONU housing and a thermistor configured to measure temperature within said BOSA ONU housing.

14. The method of claim 10, wherein said first and second selected wavelengths includes International Telecommunication (ITU) dense wavelength division multiplexing (DWDM) channels wavelengths.

15. The method of claim 10, wherein said photo diode is an avalanche photo diode coupled to a transimpedance amplifier.

16. The method of claim 10, further comprising integrating one or more signal pin connectors to said BOSA ONU housing, said signal pin connectors configured to couple said ONU to external systems.

17. The method of claim 10, further comprising integrating an optical fiber housing to said BOSA ONU housing, said optical fiber housing configured to couple said single optical fiber for transmission of said first optical signal and reception of said second optical signal.

* * * * *